United States Patent Office 3,555,152
Patented Jan. 12, 1971

3,555,152
CONTROLLING FUNGI AND BACTERIA WITH 2,3-DIALKYL - N[(HALOALKYL)THIO]BICARBAM-IMIDES
Malcolm W. Moon, Kalamazoo, Mich., assignor to The Upjohn Company, Kalamazoo, Mich., a corporation of Delaware
No Drawing. Original application Apr. 14, 1967, Ser. No. 630,827, now Patent No. 3,484,451, dated Dec. 16, 1969. Divided and this application Dec. 30, 1968, Ser. No. 788,046
Int. Cl. A01n 9/22
U.S. Cl. 424—269
15 Claims

ABSTRACT OF THE DISCLOSURE

Certain new 2,3-dialkyl - N - [(haloalkyl)thio]bicarbamimides are active against fungi and bacteria. Alkyl groups of from 1 to 12 carbon atoms are disclosed; and haloalkyl groups on the imide nitrogen having 1 and 2 carbon atoms, and the halogens chlorine, bromine, and fluorine are disclosed. The compounds can be used against bean root rot fungi.

SUMMARY OF THE INVENTION

This invention pertains to new organic chemical compounds, to new microbiocidal compositions, and to a new method for controlling microbes. The invention is more particularly directed to new 2,3-dialkyl-N-[(haloalkyl)thio]bicarbamimides, to new microbiocidal compositions containing the same, and to a new method of controlling microbes such as fungi and bacteria with the new compounds. This application is a division of application Ser. No. 630,827, filed Apr. 14, 1967, now U.S. Pat. No. 3,484,451, granted Dec. 16, 1969.

The new 2,3-dialkyl - N - [(haloalkyl)thio]bicarbamimides of this invention have the structural formula:

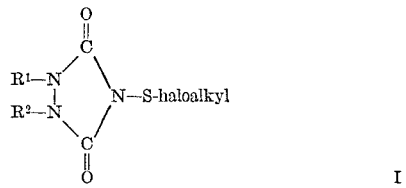

wherein $R^1$ and $R^2$ are alkyl of from 1 to 12 carbon atoms, inclusive, and "haloalkyl" is 1 to 2 carbon atoms with at least 2, preferably 3 or 4, halogen atoms.

Examples of alkyl of from 1 to 12 carbon atoms, inclusive, are methyl, ethyl, propyl, butyl, pentyl, hexyl, heptyl, octyl, nonyl, decyl, undecyl and dodecyl, including isomeric forms thereof. Examples of haloalkyl of 1 or 2 carbon atoms are trichloromethyl, bromochlorofluoromethyl, bromodichloromethyl, chlorodifluoromethyl, fluorodichloromethyl, 2,2,2-trichloroethyl, 1,2,2-trichloroethyl, dichloromethyl, 1,1,2,2-tetrachloroethyl, and the like.

It has been found that the new 2,3-dialkyl-N-[(haloalkyl)-thio]bicarbamimides of this invention are active against microorganisms. The compounds are particularly active against fungi and bacteria. Illustratively, the bean root rot fungi, Fusarium solani f. phaseoli and Rhizoctonia solani, are controlled by 2,3-dimethyl-N-[(trichloromethyl)thio]bicarbamimide. The compound is also active against the fungi Botrytis cinerea, Fusarium oxysporum, Monolinia fructicola, Pythium ultimum, Stemphyllium species, Verticillium albo-atrum, and Cytospora species. The compound is active against bacteria, for example, Pseudomonas phaseolicola and Xanthomonas vesicatoria. The compounds of this invention can be used, therefore, to control both bacteria and fungi.

In accordance with the invention, the novel 2,3-dialkyl-N-[(haloalkyl)thio]bicarbamimides can be used in the novel compositions of the invention to control fungal and bacterial growth on organic matter such as wood, cellulosic fibers, seeds, fruits, and vegetables, living plants; soil; and on animals such as fish, reptiles, birds, cattle, horses, dogs, cats and other animals. The invention includes therefore new compounds, new compositions, and a new method for controlling fungi and bacteria in general as well as specific fungi and bacteria that are pathogenic to seeds, plants, and animals.

DETAILED DESCRIPTION

The new 2,3-dialkyl-N-[(haloalkyl)thio]bicarbamimides of this invention (compounds of Formula I) are prepared by reacting a haloalkylsulfenyl halide, preferably a chloride, with an alkali metal salt of 2,3-dialkylbicarbamimide. The reaction is advantageously effected in an aqueous medium, preferably an aqueous solution of an alkali metal hydroxide (e.g., sodium or potassium hydroxide) so as to form the alkali metal salt of the bicarbamimide in situ. A pre-formed alkali metal salt of a bicarbamimide can be used if desired. Heat is evolved by the reaction of the alkali metal-imide salt and the haloalkylsulfenyl halide, so the reactants should be mixed slowly accompanied by thorough stirring. The temperature of the reaction mixture is conveniently kept at about 0° C., but reaction temperatures as low as about —10° C. and as high as about 30° C. can be used. At the higher temperatures the reactants should be mixed more slowly. The reaction product separates from the reaction mixture as a solid or can be precipitated by the addition of organic media, for example, petroleum ether (preferably), acetone, benzene, and the like.

The stoichiometry of the reaction requires one molecular equivalent of the haloalkylsulfenyl for each molecular equivalent of the bicarbamimide. In general, however, a slight excess of the haloalkylsulfenyl halide is preferred, although an excess of either reactant can be used if desired.

The new 2,3 - dialkyl-N-[(haloalkyl)thio]bicarbamimides are recovered from the reaction mixture and purified by conventional methods. When the desired product separates as a solid from the reaction mixture, it can be recovered on a filter, washed free of byproducts and unreacted starting materials, and purified by recrystallization from a suitable liquid medium, e.g., petroleum ether, benzene, and acetone, and the like.

Alternatively, the compounds of Formula I can be prepared by suspending an anhydrous alkali metal salt of a 2,3-dialkylbicarbamimide in an inert reaction medium, e.g., benzene, toluene and the like, and heating to about 50°–80° C. in the presence of a selected haloalkylsulfenyl halide. After the reaction is completed the reaction mixture is cooled and filtered, and the filtrate is concentrated in order to obtain the desired compound.

The starting 2,3-dialkylbicarbamimides are preparable according to known methods. Illustratively, they can be prepared by heating and cyclizing a 1,2-dialkyl-1,2-dicarbamylhydrazine. The cyclization is effected by heating the 1,2-dialkyl-1,2-dicarbamylhydrazine at a temperature of about 250° C. according to the method of Arndt et al., Rev. faculté sci. univ. Istanbul 13A, pp. 127–146 (1948) [C.A. 42, p. 8190 (1948)].

The starting 1,2-dialkyl-1,2-dicarbamylhydrazines are prepared by condensing a 1,2-dialkylhydrazine acid addition salt with potassium cyanate. Two molecular equivalents of the potassium cyanate per molecular equivalent of the 1,2-dialkylhydrazine salt are required according to stoichiometric theory.

Some representative known 1,2-dialkylhydrazines for the synthesis include 1,2-dimethylhydrazine, 1,2-diethylhydrazine, 1,2-dipropylhydrazine, 1,2-diisopropylhydrazine, 1,2-diisobutylhydrazine, and 1-methyl-2-isopropylhydrazine. Other representative 1,2-dialkylhydrazines can be prepared according to known methods, e.g., the method described by Renaud and Leitch, Can. J. Chem. 32, p. 545 (1954).

Alternatively, the starting 2,3-dialkylbicarbamimides are prepared by alkylating a 2-alkylbicarbamimide. Illustratively, Arndt et al., supra, prepared 2-methylbicarbamimide by condensing 2-methylsemicarbazide with ethyl chlorocarbonate by heating at the reflux temperature in ethyl acetate to obtain 1-carbethoxy-2-methylsemicarbazide which when boiled in aqueous 2 N NaOH and neutralized with acid gave 2-methylbicarbamimide. The 2-alkylbicarbamimides prepared in this way can be alkylated by conventional procedures to give symmetrical or unsymmetrical 2,3-dialkylbicarbamimides.

Alternatively, the 2,3-dialkylbicarbamimides can be prepared by the procedure described in U.S. Pat. No. 2,944,060.

The novel 2,3-dialkyl-N-[(haloalkyl)thio]bicarbamimides of this invention (compounds according to Formula 1) are formulated as fungicides and bactericides with solid and liquid carriers with or without adjuvants. The compounds can be used in pure form, but generally the interest of economy is best served by the formulations of the invention. The pure active compounds or the formulations can be applied to fungi, bacteria, objects, or situs for preventing fungal and bacterial growths. The microbiocidal formulations of this invention include dispersions in powder and granular carriers, e.g., dusts and granules; dispersions in liquid carriers, e.g., true solutions, suspensions and emulsifiable concentrates; smokes and aerosols; emulsions, i.e., creams and ointments; and capsules and tablets.

The 2,3-dialkyl-N-[(haloalkyl)thio]bicarbamimides of this invention are solids, and they can be readily formulated as dusts by grinding a mixture of the compound and a pulverulent carrier in the presence of each other. Grinding is conveniently accomplished in a ball mill, a hammer mill, or by air-blast micronization. A suitable ultimate particle size is less than 60 microns. Preferably, 95% of the particles are less than 50 microns, and about 75% are 5 to 20 microns. Dusts of that degree of comminution are conveniently free-flowing and can be applied to animals, inanimate matter, fruit trees, crop plants, and soil so as to effect thorough distribution and coverage. Dusts are particularly adapted for effectively controlling plant fungi over wide areas when applied by airplane. They are also indicated for application to the undersides o plant foliage and to the skin of hairy animals.

Representative suitable pulverulent carriers include the natural clays such as China, Georgia, Barden, attapulgus, kaolin, and bentonite clays; minerals in their natural forms as they are obtained from the earth such as talc, pyrophyllite, quartz, diatomaceous earth, fuller's earth, chalk, rock phosphates and sulfates, calcium carbonates, sulfur, silica and silicates; chemically modified minerals such as washed bentonite, precipitated calcium phosphate, precipitated calcium carbonate, precipitated calcium silicate, synthetic magnesium silicate, and colloidal silica; and organic flours such as wood, walnut shell, soybean, cottonseed, and tobacco flours, and free-flowing, hydrophobic starches.

Dusts can also be prepared by dissolving the 2,3-dialkyl-N-[(haloalkyl)thio]bicarbamimides in a volatile solvent such as methylene chloride, mixing the solution with a pulverulent carrier and evaporating the solvent.

The proportions of pulverulent carrier and 2,3-dialkyl-N-[(haloalkyl)thio]bicarbamimide can vary over a wide range depending upon the microbes to be controlled and the conditions of treatment. In general, dust formulations can contain up to about 90% (on a weight basis) of the active ingredient. Dusts having as little as 0.001% of the active ingredient can be used, but a generally preferred proportion is from about 0.50% to about 20% of active ingredient.

The dispersible powder formulations of this invention are prepared by incorporating a surfactant in a dust composition prepared as described above. When about 0.1% to about 12% of a surfactant is incorporated in a dust, the dispersible powder thus obtained is particularly adapted for further admixture with water for spraying on inanimate matter and products, fruit trees, field crops, soil, and livestock. The dispersible powders can be admixed with water to obtain any desired concentration of active ingredient, and the mixture can be applied in amounts sufficient to obtain predetermined rates of application and uniform distribution. With this flexibility in mind, the dispersible powders of the invention can conveniently comprise preferably about 10% to about 80% of active ingredient.

Representative surfactants useful for preparing dispersible powder formulations of this invention include alkyl sulfates and sulfonates, alkyl aryl sulfonates, sulfosuccinate esters, polyoxyethylene sulfates, polyoxyethylene-sorbitan monolaurate, alkyl aryl polyether sulfates, alkyl aryl polyether alcohols, alkyl naphthalene sulfonates, alkyl quaternary ammonium salts, sulfated fatty acids and esters, sulfated fatty acid amides, glycerol mannitan laurate, polyalkylether condensates of fatty acids, lignin sulfonates, and the like. The preferred class of surfactants includes blends of sulfonated oils and polyalcohol carboxylic acid esters (Emcol H–77), blends of polyoxyethylene ethers and oil-soluble sulfonates (Emcol H–400), blends of alkyl aryl sulfonates and alkylphenoxy polyethoxy ethanols (Tritons X–151, X–161, and X–171), e.g., about equal parts of sodium kerylbenzene sulfonate and isooctylphenoxy polyethoxy ethanol containing about 12 ethoxy groups, and blends of calcium alkyl aryl sulfonates and polyethoxylated veegtable oils (Agrimul N$_4$S). It will be understood, of course, that the sulfate and sulfante surfactants suggested above will preferably be used in the form of their soluble salts, for example, their sodium salts. All of these surfactants are capable of reducing the surface tension of water to less than about 40 dynes per centimeter in concentrations of about 1% or less. The dispersible powder compositions can be formulated with a mixture of surfactants of the types indicated if desired.

A suitable dispersible powder formulation is obtained by blending and milling 327 lbs. of Georgia clay, 4.5 lbs. of isooctylphenoxy polyethoxy ethanol (Triton X–100) as a wetting agent, 9 lbs. of a polymerized sodium salt of substituted benzoid long-chain sulfonic acid (Daxad 27) as a dispersing agent, and 113 lbs. of the active ingredient. The resulting formulation has the following percentage composition (parts herein are by weight unless otherwise specified):

| | Percent |
|---|---|
| Active ingredient | 25 |
| Isooctylphenoxy polyethoxy ethanol | 1 |
| Polymerized sodium salt of substituted benzoid long-chain sulfonic acid | 2 |
| Georgia clay | 72 |

This formulation, when dispersed in water at the rate of 10 lbs. per 100 gals., give a spray formulation containing about 0.3% (3000 p.p.m.) active ingredient which can be applied to soil, plant growth media, or turf at the rate of 40 gals. per acre to give a total application of active ingredient of 1 lb. per acre.

If desired, dispersants such as methyl cellulose, polyvinyl alcohol, sodium ligninsulfonates, and the like can be included in the dispersible powder formulations of this invention. Adhesive or sticking agents such as vegetable oils, naturally occurring gums, casein, and others can also be included. Corrosion inhibitors such as epichlorohydrin and anti-foaming agents such as stearic acid can also be included.

The granular formulations according to this invention are prepared by permeating a granular carrier with a solution of a 2,3 - dialkyl - N - [(haloalkyl)thio]bicarbamimide and then drying the granules. Suitable granular carriers include vermiculite, pyrophyllite, and attapulgite. Suitable solvents include acetone, methyl ethyl ketone, and methylene chloride. A solution of a 2,3-dialkyl-N-[(haloalkyl)thio]bicarbamimide is sprayed on a granular carrier while the carrier is being mixed and tumbled. The granules are then dried. The granules can range in size from about 10 to about 60 mesh, preferably about 30 to about 60 mesh.

The compounds of this invention can be applied to fungi, bacteria, objects, or situs in aqueous sprays without a solid carrier. Since, however, the compounds themselves are relatively insoluble in water they are preferably dissolved in a suitable inert organic solvent carrier. Advantageously, the solvent carrier is immiscible with water so that an emulsion of the solvent carrier in water can be prepared. If, for example, a water-miscible solvent carrier such as ethanol is used the solvent carrier will dissolve in the water and any excess compound will be thrown out of solution. In an oil-in-water emulsion, the solvent phase is dispersed in the water phase and the dispersed phase contains the active ingredient. In this way, uniform distribution of a water insoluble active ingredient is achieved in an aqueous spray. A solvent carrier in which 2,3-dialkyl-N-[(haloalkyl)thio]bicarbamimides are highly soluble is desirable so that relatively high concentrations of active ingredient can be obtained. Sometimes, one or more solvent carriers with or without a cosolvent can be used in order to obtain concentrated solutions of the active ingredient, the main consideration being to employ a water-immiscible solvent for the active ingredient that will hold the compound in solution over the range of concentrations useful for preventing fungi and bacterial growths.

The emulsifiable concentrates of the invention are prepared, therefore, by dissolving the active ingredient and a surfactant in a substantially water-immiscible solvent carrier (i.e., a solvent carrier which is soluble in water to the extent of less than 2.5% by volume at temperatures of the order of 20° to 30° C.), for example, cyclohexanone, methyl propyl ketone, summer oils, ethylene dichloride, aromatic hydrocarbons such as benzene, toluene, and xylene, and high-boiling petroleum hydrocarbons such as kerosene, diesel oil, and the like. If desired, a cosolvent such as methyl ethyl ketone, acetone, isopropanol, and the like can be included with the solvent carrier in order to enhance the solubility of the active ingredient. Aqueous emulsions are then prepared by mixing with water to give any desired concentration of active ingredient. The surfactants which can be employed in the aqueous emulsions of the invention are those types noted above. Mixtures of surfactants can be employed, if desired.

Advantageously, the concentration of active ingredient in the emulsifiable concentrates can range from about 5% to about 50% by weight, preferably from about 10% to 40%. A concentrate comprising 20% (by weight) of the compound dissolved in a water-immiscible solvent of the kind noted above can be admixed with an aqueous medium in the proportions of 13 ml. of concentrate with 1 gal. of medium to give a mixture containing 700 parts of active ingredient per million parts of liquid carrier. Similarly, 1 qt. of a 20% concentrate mixed with 40 gals. of water provides about 1200 p.p.m. (parts per million) of active ingredient. In the same manner, more concentrated solutions of active ingredient can be prepared.

The concentrate compositions of the invention which are intended for use in the form of aqueous dispersions or emulsions can also comprise a humectant, that is to say, an agent which will delay the drying of the composition in contact with material to which it has been applied. Suitable humectants include glycerol, diethylene glycol, solubilized lignins, such as calcium ligninsulfonate, and the like.

The rates of application to fungi, bacteria, objects, or situs will depend upon the species of microbes to be controlled, the presence or absence of desirable living organisms, temperature conditions of treatment, and the method and efficiency of application. In general, fungicidal activity is obtained when the compounds are applied at concentrations of about 10 to about 6000 p.p.m., preferably at concentrations of about 100 to about 1200 p.p.m.

The compositions containing 2,3-dialkyl-N-[(haloalkyl)thio]bicarbamimides according to the invention, can be applied by conventional methods to fungi, bacteria, objects or any situs where control of fungi and bacteria is desired. For example, an area of soil or plants can be treated by spraying wettable powder suspensions, emulsions, or solutions from boom-type power sprayers or from hand-operated knapsack sprayers. Dusts can be applied by power dusters, or by hand-operated dusters. Creams and ointment formulations can be applied to skin or objects for prolonged protection from fungi and bacteria.

The following examples are illustrative of the process and products of the present invention, but are not to be construed as limiting.

EXAMPLE 1

Preparation of 2,3-dimethyl-N-[(trichloromethyl)thio] bicarbamimide

Trichloromethylsulfenyl chloride (3.0 ml.) was added dropwise with stirring to a chilled solution of 2,3-dimethylcarbamimide (3.15 gm., 0.024 mole) in aqueous sodium hydroxide (prepared by dissolving 0.98 gm. sodium hydroxide in 20 ml. water). The precipitate that formed was collected on a filter; and the filter cake was washed with water and petroleum ether. After drying and recrystallizing from a mixture of benzene and petroleum ether, there was obtained 2,3-dimethyl-N-[(trichloromethyl)-thio]bicarbamimide having a melting point of 81° to 83° C.

*Analysis.*—Calc'd for $C_5H_6Cl_3N_3O_2S$ (percent): C, 21.56; H, 2.17; Cl, 38.19; N, 15.09; S, 11.51. Found (percent): C, 21.79; H, 2.37; Cl, 38.34; N, 15.15; S, 11.24.

Following the same procedure, but substituting fluorodichloromethylsulfenyl chloride, dichloromethylsulfenyl chloride, 2,2,2-trichloroethylsulfenyl chloride, 1,2,2-trichloroethylsulfenyl chloride, 1,1,2,2 - tetrachloroethylsulfenyl chloride, bromochlorofluoromethylsulfenyl chloride, bromodichloromethylsulfenyl chloride, and chlorodifluoromethylsulfenyl chloride, respectively, for trichloromethylsulfenyl chloride there are prepared:

2,3-dimethyl-N-[(fluorodichloromethyl)thio] bicarbamimide,
2,3-dimethyl-N-[(dichloromethyl)thio]bicarbamimide,
2,3-dimethyl-N-[(2,2,2-trichloroethyl)thio] bicarbamimide,
2,3-dimethyl-N-[(1,2,2-trichloroethyl)thio] bicarbamimide,
2,3,-dimethyl-N-[(1,1,2,2-tetrachloroethyl)thio] bicarbamimide,
2,3-dimethyl-N-[(bromochlorofluoromethyl)thio] bicarbamimide, 2,3-dimethyl-N-[(bromodichloromethyl)thio]
bicarbamimide, and
2,3-dimethyl-N-[(chlorodifluoromethyl)thio]
bicarbamimide, respectively.

EXAMPLE 2

Preparation of 2,3-diisopropyl-N-[(trichloromethyl)thio]bicarbamimide

Trichloromethylsulfenyl chloride (4.0 ml.) was added dropwise with stirring to a chilled solution of 2,3-diisopropylbicarbamimide (4.0 gm., 0.022 mole) in 22.0 ml. 1 N aqueous sodium hydroxide. After diluting the reaction mixture with 10 ml. cold petroleum ether, stirring was continued at 0° C. for 30 min. The precipitate that formed was collected on a filter; and the filter cake was washed with water and dried. The dry filter cake was recrystallized from a mixture of acetone and petroleum ether, and then from a mixture of benzene and petroleum ether. There was thus obtained 2,3-diisopropyl-N-[(trichloromethyl)thio]bicarbamimide having a melting point of 83° to 88° C.

Analysis.—Calc'd for $C_9H_{14}Cl_3N_3O_2S$ (percent): N, 12.56; S, 9.59. Found (percent) N, 12.75; S, 9.42.

EXAMPLE 3

Preparation of 2,3-dipropyl-N-[(trichloromethyl)thio]bicarbamimide

Trichloromethylsulfenyl chloride (3.0 ml.) was added dropwise with stirring to a chilled solution of 1,2-dipropylbicarbamimide (2.5 gm., 0.014 mole) in 13.5 ml. 1 N aqueous sodium hydroxide. After diluting the reaction mixture with 15 ml. cold petroleum ether, stirring was continued at 0° C. for 30 min. The precipitate that formed was collected on a filter; and the filter cake was dried. After recrystallizing from petroleum ether, there was obtained 2,3-dipropyl-N-[trichloromethyl)thio]bicarbamimide having a melting point of 85° to 87° C.

Analysis.—Calc'd for $C_9H_{14}Cl_3N_3O_2S$ (percent): C, 32.30; H, 4.22; Cl, 31.79; N, 12.56; S, 9.59. Found (percent): C, 32.51; H, 4.35; Cl, 31.80 N, 12.68 S, 9.59.

EXAMPLE 4

Following the procedure of Example 2, but substituting 2,3-diethylbicarbamimide, 2,3-di-sec-butylbicarbamimide, 2,3-diisobutylbicarbamimide, and 2-ethyl-3-isopropylbicarbamimide for 2,3-diisopropylbicarbamimide, there are prepared 2,3-diethyl-N-[(trichloromethyl)thio]bicarbamimide, 2,3 - di-sec-butyl-N-[(trichloromethyl)thio]bicarbamimide, 2,3 - diisobutyl - N-[(trichloromethyl)thio]bicarbamimide, and 2-ethyl-3-isopropyl-N-[(trichloromethly)thio]bicarbamimide, respectively.

Further following the same procedure but substituting the indicated bicarbamimides, 2-methyl-3-ethylbicarbamimide,
2-methyl-3-propylbicarbamimide,
2-methyl-3-isopropylbicarbamimide,
2-methyl-3-neopentylbicarbamimide,
2-methyl-3-hexylbicarbamimide,
2,methyl-3-octylbicarbamimide,
2-methyl-3-dodecylbicarbamimide,
2-methyl-3-sec-butylbicarbamimide,
2-methyl-3-heptylbicarbamimide, and
2-methyl-3-butylbicarbamimide for the 2,3-diisopropylbicarbamimide there can be prepared:

2-methyl-3-ethyl-N-[(trichloromethyl)thio]
bicarbamimide,
2-methyl-3-propyl-N-[(trichloromethyl)thio]
bicarbamimide,
2-methyl-3-isopropyl-N-[(trichloromethyl)thio]
bicarbamimide,
2-methyl-3-neopentyl-N-[(tricholormethyl)thio]
bicarbamimide,
2-methyl-3-hexyl-N-[(trichloromethyl)thio]
bicarbamimide,
2-methyl-3-octyl-N-[(trichloromethyl)thio]
bicarbamimide,
2-methyl-3-dodecyl-N-[(trichloromethyl)thio]
bicarbamimide,
2-methyl-3-sec-butyl-N-[(trichloromethyl)thio]
bicarbamimide,
2-methyl-3-heptyl-N-[(trichloromethyl)thio]
bicarbamimide, and
2-methyl-3-butyl-N-[(trichloromethyl)thio]
bicarbamimide, respectively.

I claim:

1. The process for controlling fungi and bacteria which comprises applying to a situs a 2,3-dialkyl-N-[(haloalkyl)thio]bicarbamimide of the formula:

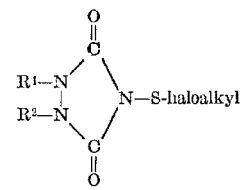

wherein $R^1$ and $R^2$ are alkyl of from 1 to 12 carbon atoms, inclusive, and "haloalkyl" has 1 or 2 carbon atoms with at least 2 halogen atom substituents.

2. The process according to claim 1 wherein "haloalkyl" is trihalomethyl.

3. The process according to claim 2 wherein "trihalomethyl" is trichloromethyl.

4. The process according to claim 3 wherein 2,3-dimethyl-N-[(trichloromethyl)thio]bicarbamimide is applied.

5. The process according to claim 3 wherein 2,3-diisopropyl-N-[(trichloromethyl)thio]bicarbamimide is applied.

6. The process according to claim 3 wherein 2,3-dipropyl-N[(trichloromethyl)thio]bicarbamimide is applied.

7. Composition for controlling fungi and bacteria which comprises a dispersible carrier, and the active ingredient 2,3-dialkyl-N-[(haloalkyl)thio]bicarbamimide of the formula

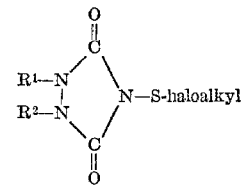

wherein $R^1$ and $R^2$ are alkyl of from 1 to 12 carbon atoms, inclusive and "haloalkyl" has 1 or 2 carbon atoms with at least 2 halogen atom substituents.

8. Composition according to claim 7 comprising a surfactant.

9. Composition according to claim 8 wherein "haloalkyl" is trihalomethyl.

10. Composition according to claim 9 wherein "trihalomethyl" is trichloromethyl.

11. Composition according to claim 10 wherein the active ingredient is 2,3-dimethyl-N-[(trichloromethyl)thio]bicarbamimide.

12. Composition according to claim 10 wherein the active ingredient is 2,3-diisopropyl-N-[(trichloromethyl)thio]bicarbamimide.

13. Composition according to claim 10 wherein the active ingredient is 2,3-dipropyl-N-[(trichloromethyl)thio]bicarbamimide.

14. Composition according to claim 8 wherein the dispersible carrier is a pulverulent carrier.

15. Composition according to claim 14 wherein there is up to 90% of 2,3-dimethyl-N-[(trichloromethyl)thio]bicarbamimide.

References Cited

UNITED STATES PATENTS

| 2,553,770 | 5/1951 | Kittleson | 260—301X |
| 3,251,850 | 5/1966 | Kuhle et al. | 260—301X |

SHEP K. ROSE, Primary Examiner